(12) United States Patent
Shaffer et al.

(10) Patent No.: US 7,178,729 B2
(45) Date of Patent: Feb. 20, 2007

(54) METHODS AND DEVICES FOR PROVIDING ALERTS FOR SPOILAGE AND HAZARDOUS COMBINATIONS

(75) Inventors: Daniel Shaffer, Palo Alto, CA (US); Shmuel Shaffer, Palo Alto, CA (US); Labhesh Patel, Mountain View, CA (US); Gebran Chahrouri, Menlo Park, CA (US); Shantanu Sharkar, San Jose, CA (US); Bruce Moon, Dublin, CA (US); Joseph Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/067,279

(22) Filed: Feb. 25, 2005

(65) Prior Publication Data

US 2006/0192001 A1    Aug. 31, 2006

(51) Int. Cl.
*G06F 19/00* (2006.01)
(52) U.S. Cl. .................................... 235/385
(58) Field of Classification Search ............. 235/385
See application file for complete search history.

(56) References Cited

U.S. PATENT DOCUMENTS

| | | | |
|---|---|---|---|
| 5,339,073 A | 8/1994 | Dodd et al. | |
| 5,850,187 A | 12/1998 | Carrender et al. | |
| 5,887,176 A | 3/1999 | Griffith et al. | |
| 6,539,281 B2 | 3/2003 | Wan et al. | |
| 6,553,489 B1 | 4/2003 | Osler et al. | |
| 2001/0028308 A1* | 10/2001 | De La Huerga | 340/573.1 |
| 2002/0016739 A1* | 2/2002 | Ogasawara | 705/22 |
| 2003/0120384 A1* | 6/2003 | Haitin et al. | 700/242 |
| 2004/0100383 A1* | 5/2004 | Chen et al. | 340/572.1 |
| 2004/0108795 A1* | 6/2004 | Meek et al. | 312/218 |
| 2004/0123113 A1* | 6/2004 | Mathiassen et al. | 713/185 |

OTHER PUBLICATIONS

R. Droms, *Dynamic Host Configuration Protocol*, http://www.ietf.org/rfc/, Bucknell Unversity, Mar. 1997, (RFC 2131), printed Mar. 24, 2005, 43 pages.

S. Alexander et al., *DHCP Options and BOOTP Vendor Extensions*, http://www.ietf.org/rfc/, Silicon Graphics, Inc., Mar. 1997 (RFC 2132), printed Mar. 24, 2005, 32 pages.

G. Stump et al., *The User Class Option for DHCP*, http://www.ietf.org/rfc/, IBM, Nov. 2000 (RFC 3004), printed Mar. 24, 2005, 6 pages.

(Continued)

*Primary Examiner*—Michael G. Lee
*Assistant Examiner*—Tae W. Kim
(74) *Attorney, Agent, or Firm*—Beyer Weaver LLP

(57) ABSTRACT

The present invention includes methods and devices for providing safeguards to the access of certain substances. Some implementations provide alerts and/or other appropriate actions when substances are subject to spoilage or expiration. Some implementations provide responses to potentially dangerous combinations of substances. Other aspects of the invention involve determining the allergies of a user and providing a warning when allergens are, or recently have been, present. One preferred embodiment provides a smart medicine cabinet for helping to provide medication safely to a patient and to provide other related services.

26 Claims, 9 Drawing Sheets

OTHER PUBLICATIONS

Y. T'Joens, *DHCP Reconfigure Extension,* http://www.ietf.org/rfc/, Alcatel, Dec. 2001, printed Mar. 24, 2005 (RFC 3203), 6 pages.

M. Patrick, *DHCP Relay Agent Information Option,* http://www.ietf.org/rfc/, Motorola BCS, Jan. 2001 (RFC 3046), printed Mar. 24, 2005, 14 pages.

EPCgl, *Frequently Asked Questions,* http://www.epcglobalinc.com/about/faqs.html, printed Mar. 24, 2005, 9 pages.

*EPC™ Tag Data Standards Version 1.1 Rev.1.24,* EPCglobal, Standard Specification, Apr. 1. 2004, 78 pages.

*Global Location Number (GLN) Implementation Guide,* Uniform Code Council, Inc., May 2002, 13 pages.

*The Global Language of Business,* http://www.ean-int.org/locations.html, printed Mar. 24, 2005, 5 pages.

M. Kanellos, *Newsmaker: Making sense of sensors,* CNET News.com: news.com.com/Making+sense+of+sensors/ 2008-1082_3-5829415.html, Published: Aug. 12, 2005, 7 pages.

International Search Report dated Feb. 17, 2006, from related International Application No. PCT/US05/15322, 5 pp. including Notification of Transmittal (CISCP378WO).

Written Opinion of the International Searching Authority dated Feb. 17, 2006, from related International Application No. PCT/US05/15322, 3 pp. (CISCP378WO).

International Search Report dated May 26, 2006, from corresponding International Application No. PCT/US06/05843, including Notification of Transmittal 4 pages (CISCP416WO).

Written Opinion of the International Searching Authority dated May 26, 2006, from corresponding International Application No. PCT/US06/05843, 6 pages (CISCP416WO).

\* cited by examiner

METHODS AND DEVICES FOR PROVIDING ALERTS FOR SPOILAGE AND HAZARDOUS COMBINATIONS

BACKGROUND OF THE INVENTION

1. Field of the Invention

The present invention relates to radio frequency identification ("RFID") technology. More particularly, the present invention relates to networks that include RFID devices.

2. Description of the Related Art

There are many products in commerce that can spoil and/or that are potentially dangerous. It is well known, for example, that certain food products can cause illness when consumed after their expiration date. Many products, such as batteries and medicines, lose their effectiveness after a certain period of time.

Some products are unhealthy only for certain individuals, because of allergies that these individuals have. For example, certain fibers and chemicals can cause some individuals to break out in a rash or cause respiratory problems. Food allergies can cause reactions that range from mild discomfort to a gruesome death.

Moreover, some products become dangerous when combined with other products. For example, if ammonia and bleach are combined, the resulting chemical reaction will cause toxic chlorine gas to be released. It is not uncommon for certain types of medication, which have no significant side effects when taken alone, to cause serious illness or death when taken in combination with other medicines. This may happen, for example, when a person has changed doctors or is seeing more than one doctor for different ailments.

Therefore, it would be advantageous to provide methods and devices that can detect and respond to spoilage and/or dangerous combinations of products. It would be particularly helpful if such methods and devices could take into account the allergies or other sensitivities of individual consumers.

SUMMARY OF THE INVENTION

The present invention includes methods and devices for providing safeguards to the access of certain substances. Some implementations provide alerts and/or other appropriate actions when substances are subject to spoilage or expiration. Some implementations provide responses to potentially dangerous combinations of substances. Other aspects of the invention involve determining the allergies of a user and providing a warning when allergens are, or recently have been, present. One preferred embodiment provides a smart medicine cabinet for helping to provide medication safely to a patient and to provide other related services.

Some aspects of the invention involve a method of providing products. The method includes the following steps: reading radio frequency identification ("RFID") tag data for each of a plurality of products in a storage area; automatically obtaining product information according to the RFID tag data; automatically evaluating the product information; and automatically providing product advice according to the product information.

The product advice may include product freshness information and/or advice that combining products in the storage area would be dangerous. The product freshness information may include a notification regarding the expiration date of a product and/or a notification regarding which product of a product type should be used first.

The method may include the step of automatically obtaining allergy information from a user and the product advice may include allergen advice, such as identifying a product to which the user is allergic.

Some embodiments of the invention involve an apparatus for providing products. The apparatus includes the following elements: a storage area; an RFID reader configured for reading RFID tag data for products stored in the storage area; a mechanism for obtaining and evaluating product information according to the RFID tag data; and at least one device for providing product advice according to the product information.

Alternative embodiments of the invention provide a smart medicine cabinet that includes the following elements: a storage area; an RFID reader configured for reading RFID tag data for medicine stored in the storage area; a user interface configured for communication with a user; a network interface configured for communication with a network; a door; and a controller configured to obtain medical information based on the RFID tag data received from the RFID reader and to control the smart medicine cabinet according to the medical information.

The controller may be further configured to obtain the medical information by searching a networked medical database via the network interface. The smart medicine cabinet may include a storage device with medical data stored therein. If so, the controller may be further configured to obtain the medical information by searching the medical data in the storage device.

The controller may be further configured to control the smart medicine cabinet according to information received via the user interface. For example, the controller may be configured to control the door according to information received via the user interface.

Alternative aspects of the invention include a method for providing medical services. The method includes the following steps: reading RFID tag data for each of a plurality of medicines in a medicine cabinet; automatically obtaining medical information according to the RFID tag data; evaluating the medical information; and providing a response according to the medical information. The step of obtaining medical information may involve searching a medical database.

The response may involve alerting a user regarding an expiration date of medicine in the medicine cabinet, providing replacement medicine and/or providing a warning that a combination of medicine in the medicine cabinet could be dangerous. The response may also involve preventing a user from opening the medicine cabinet and/or communicating with a user via a user interface of the medicine cabinet.

DETAILED DESCRIPTION OF THE INVENTION

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

The present invention includes methods and devices for providing information about and/or controlling access to certain substances. For example, some implementations provide alerts and/or other appropriate actions when substances are nearing or past an expiration date. Some implementations provide responses to potentially dangerous combinations of substances. Other aspects of the invention involve determining the allergies of a user and providing a warning when allergens are, or recently have been, present.

Although much of the description herein pertains to "smart medicine cabinet" implementations, the invention is not limited to such implementations but instead is generally applicable to various substances that may spoil, that have an expiration date beyond which they are not useful, that may cause an allergic reaction and/or that are dangerous when combined.

Figure 1:
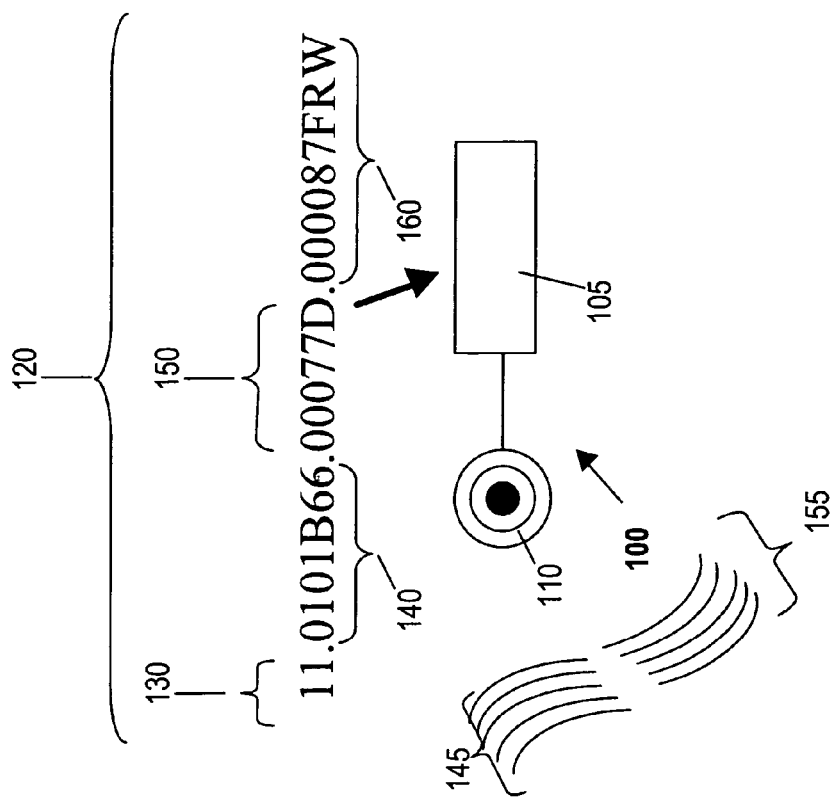
FIG. 1 is a diagram illustrating an RFID tag.

Many implementations of the present invention are based upon "smart labels," generally implemented by radio frequency identification ("RFID") tags. RFID tags have been used to keep track of items such as airline baggage, items of clothing in a retail environment, cows and highway tolls. As shown in FIG. 1, an RFID tag 100 includes microprocessor 105 and antenna 110. In this example, RFID tag 100 is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

RFID tags use the Electronic Product Code ("EPC" or "ePC") format for encoding information. An EPC code includes a variable number of bits of information (common formats are 64, 96 and 128 bits), which allows for identification of individual products as well as associated information. As shown in FIG. 1, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is normally a 40-bit field that can uniquely identify the specific instance of an individual product i.e., not just a make or model, but also down to a specific "serial number" of a make and model.

U.S. patent application Ser. No. 11/010,089, filed Dec. 9, 2004 and entitled "Methods and Devices for Providing Scalable RFID Networks" and U.S. patent application Ser. No. 10/866,285, filed Jun. 9, 2004 and entitled "Methods and Devices for Assigning RFID Device Personality" (collectively, the "RFID Network Applications") contain relevant subject matter and are hereby incorporated by reference.

For example, the RFID Network Applications describe how read/write RFID tags can capture information regarding the history of products or groups of products, e.g., temperature and other environmental changes, stresses, accelerations and/or vibrations that have acted upon the product. It is particularly useful to record such information for products that are relatively more subject to spoilage or other damage, such as perishable foods and fragile items.

Figure 2:
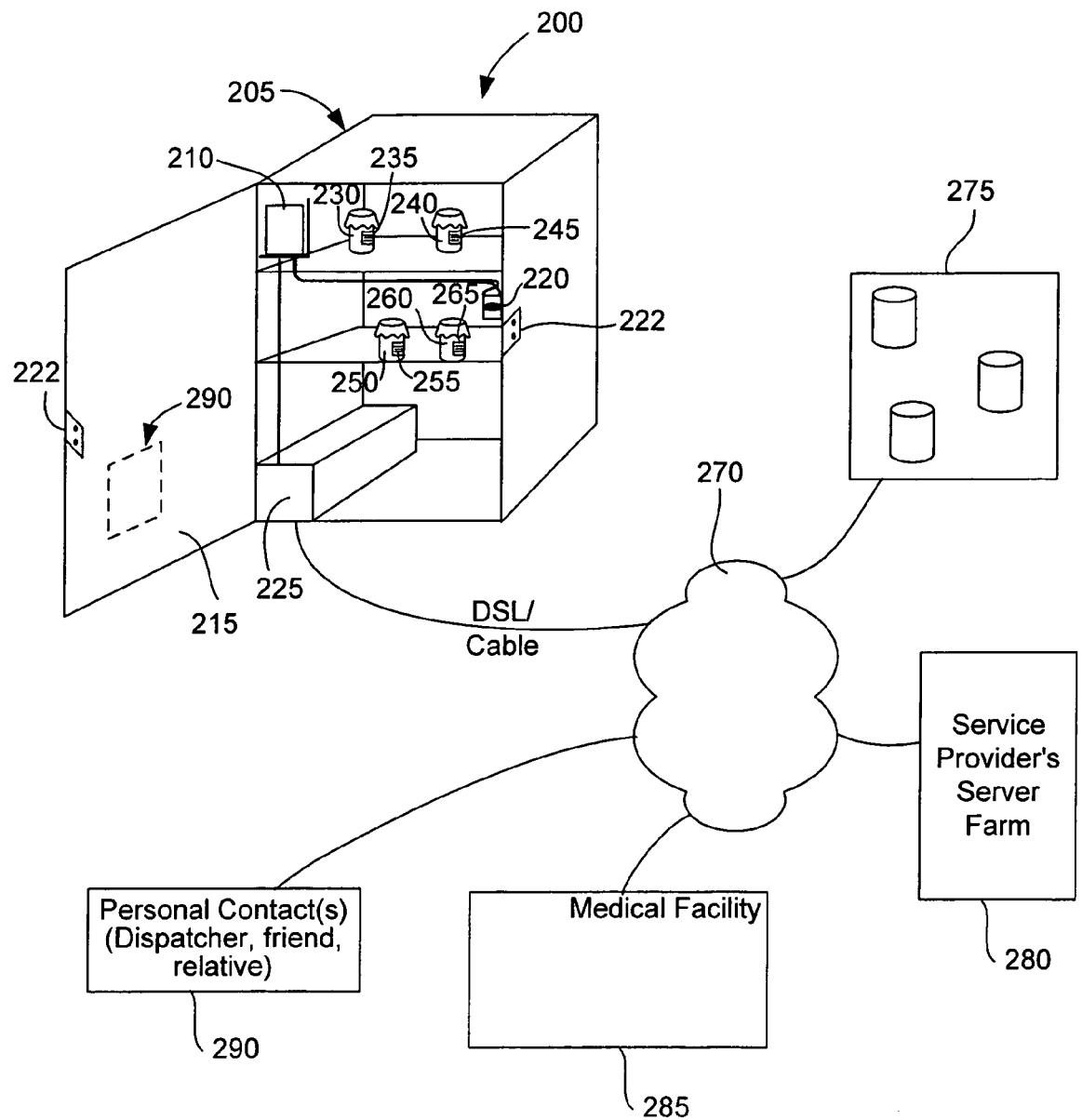
FIG. 2 is a network diagram illustrating one implementation of the present invention.

FIG. 2 depicts an embodiment of a smart medicine cabinet ("SMC") and related devices according to the present invention. SMC system 200 includes SMC 205, which in this example is connected for communication with network 270 via controller 225. Although network 270 may be any appropriate sort of network, in this example network 270 is the Internet.

Medicine bottles 230, 240, 250 and 260 bear RFID tags 235, 245, 255 and 265, respectively. RFID tags 235, 245, 255 and 265 indicate the type of medicine in medicine bottles 230, 240, 250 and 260. RFID reader 210 can identify the presence of medicine bottles 230, 240, 250 and 260 by reading RFID tags 235, 245, 255 and 265.

Accordingly, an inventory of the medicine bottles can be taken in accordance with the "reads" by RFID reader 210 of the contents of SMC 205. Data related to such an inventory (also referred to herein as "SMC inventory data") may be stored locally, e.g. in a memory of RFID reader 210 and/or controller 225. Alternatively, or additionally, SMC inventory data may be stored remotely, e.g. in a database of a service provider 280, of a medical facility 285 and/or of another third party such as a friend, relative, another emergency and/or medical service provider, etc.

Controller 225 controls, and receives RFID data from, RFID reader 210. Controller 225 also controls lock 222 and receives signals from sensor 220 indicating whether door 215 is open or closed.

Figure 2A:
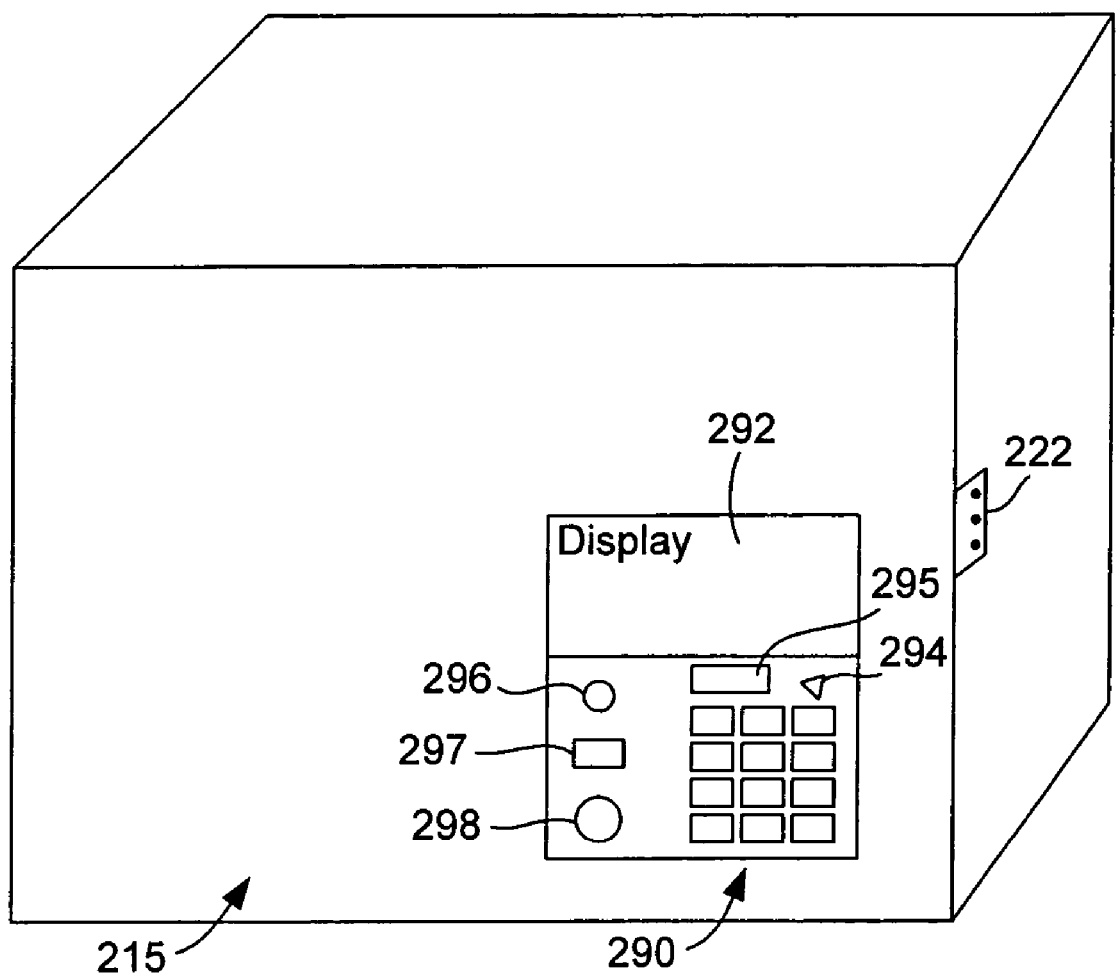
FIG. 2A illustrates one embodiment of a smart medical cabinet of the present invention.

In this embodiment, as shown in FIG. 2A, controller 225 also controls user interface 290, which is mounted an exterior side of door 215 that is not visible in FIG. 2. This embodiment of user interface 290 includes display 292, which may be a light emitting diode display, a plasma display or any other suitable display. In this example, keypad 294 allows a user to enter a code which will cause controller 225 to open lock 222 and allow access to SMC 205.

This embodiment of user interface 290 also includes scanner 295, which provides alternative methods for allowing access to SMC 205. In some such embodiments, scanner 295 is a biometric scanner for obtaining biometric identification data, such as fingerprint data or retinal data, from a user. In alternative embodiments of user interface 290, scanner 295 is an RFID scanner or a bar code scanner that can read information from a card, a bracelet or similar device. The device may contain encoded information indicating, for example, the identity of the bearer and allergies to food and/or medication. Data obtained from scanner 295 and/or keypad 294 may be compared with data stored in a memory accessible to controller 225 in order to determine whether to unlock SMC 205.

As described in more detail below, in some preferred embodiments, a user (sometimes referred to herein as a "patient," although the user may not always be a patient) may be prevented from opening door 215 under certain conditions, some of which are linked to an inventory of medicines according to reads of RFID reader 210. The SMC inventory data preferably includes information about allergies and/or sensitivity to medications that a particular patient may have.

In this example, user interface 290 also includes emergency button 296, which will allow a user to access SMC 205 without entering a code or having, e.g., an RFID card available. In some embodiments, SMC 205 will open immediately when emergency button 296 is pressed; such embodiments are appropriate, for example, for patients with certain types of life-threatening conditions. Preferably, emergency button 296 operates mechanically and will not be disabled in the event of a power outage, loss of connection with network 270, etc.

In alternative embodiments, some level of third party intervention is required to open SMC 205 even after emergency button 296 is pressed. For example, pressing emergency button 296 may cause a communication with a third party such as an attendant of a hospice or other facility, a telephone operator, a dispatcher, a guardian, relative, friend, etc. The communication may be made, e.g., across network 270 via microphone 297 and speaker 298. Such embodiments may be particularly desirable when the medicines stored within SMC 205 are narcotics or popular recreational drugs.

As described below, the expiration dates of the medicines should be obtainable by reference to RFID tags 235, 245, 255 and 265. If not, the expiration dates may be determined (e.g., by reference to medical database 275 and the date that each medicine was prepared) and associated with each of medicine bottles 230, 240, 250 and 260 in the SMC inventory data.

Figure 3:
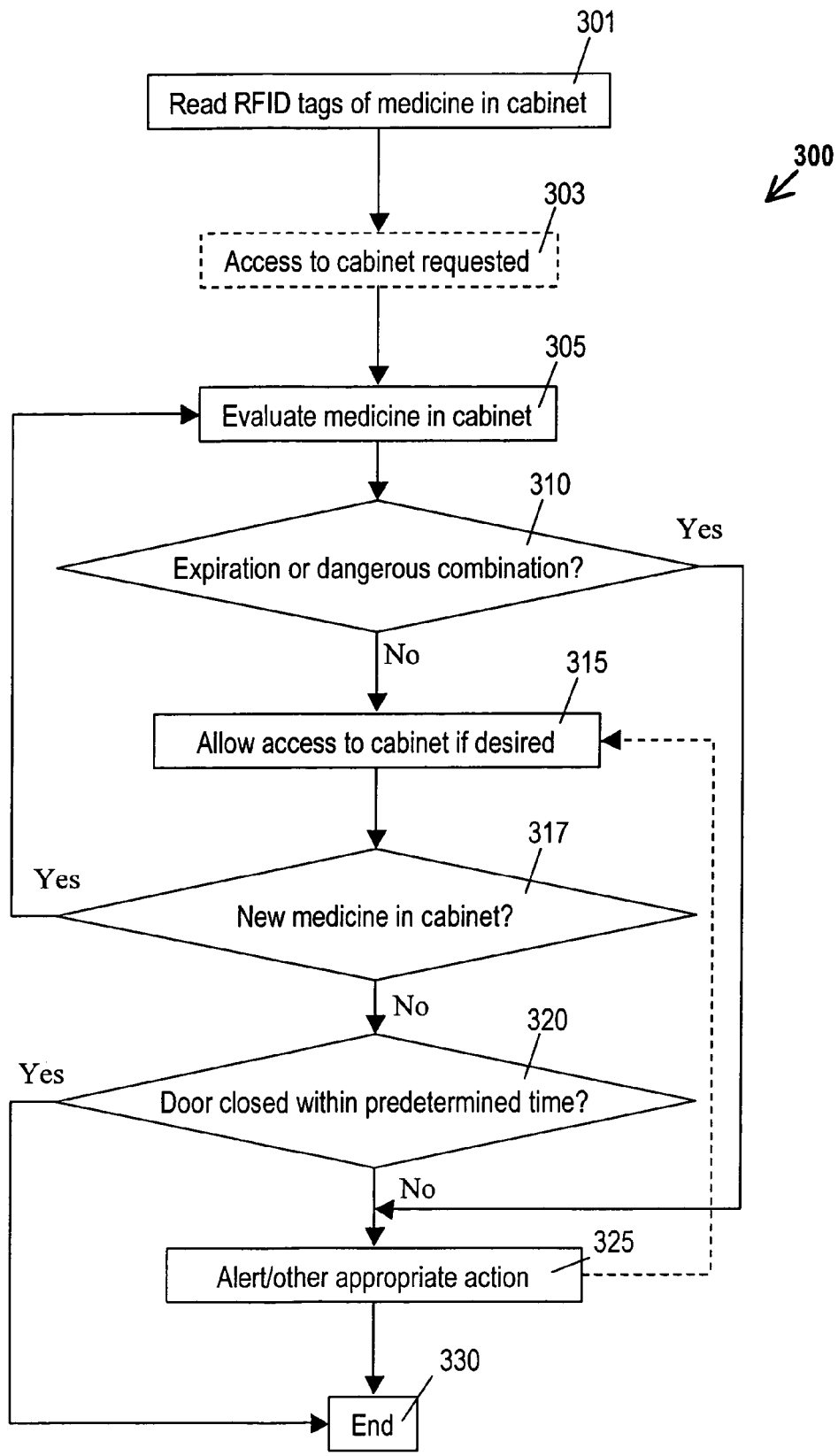
FIG. 3 is a flow chart that outlines one method of the present invention.

Method 300 is outlined in the flow chart of FIG. 3. In step 301, RFID reader 210 reads the RFID tags of medicine in SMC 205. RFID reader 210 may read at predetermined times and/or in response to predetermined events, such as the opening of door 215, a user's indicated desire to open door 215 (e.g., by entering a code, pressing a button, etc.)

In step 305, the medicines in SMC 205 are evaluated. The EPC codes on the medicine bottles that were read in step 301 will indicate the server or servers that "own" the EPC codes. Accordingly, in one implementation of step 305, the server(s) can be queried to determine, for example, the type of medicine, when and where the medicine was sold, the number of pills and dosage of each pill (for medication in pill form), the expiration date and other pertinent information.

In step 310 it is determined (in this example, by controller 225) whether there is any known condition, such as an expiration of a medicine or a dangerous combination of medicines. In preferred implementations of the invention, the evaluation of step 310 involves a determination of whether medicine has expired and whether certain combinations of medicines could be harmful.

Some implementations of the invention determine whether certain combinations of medicines could be harmful by searching medical database 275 and/or a local database that is, for example, stored in a memory of controller 225. The searches are preferably initiated automatically, e.g., upon the detection of a new medicine in SMC 205. However, it is preferred that a trained medical service provider evaluates the searches to determine the likelihood and/or severity of any combination of drugs in SMC 205. After this information is obtained, the SMC inventory data should be updated to reflect any possible adverse combinations or to indicate that none have been determined.

Depending on the type of evaluation and the particular implementation of the invention, steps 305 and/or 310 may or may not directly follow the step of reading the RFID tags. For example, steps 305 and/or 310 may be taken at predetermined time intervals (e.g., of known times when a patient may require medicine or of a predetermined time since a last access of SMC 205), in response to an expiration date that has been previously determined, in response to a new type of medication that has been placed in SMC 205, etc. Alternatively, or additionally, steps 305 and 310 may be taken in response to an indication that a user is attempting to access SMC 205 (step 303).

If it is determined in step 310 there is any known adverse condition, such as an expiration of a medicine or a dangerous combination of medicines, an alert is made and other appropriate action may be taken in step 325. The type of alert and level of action taken is preferably commensurate with the level of potential harm that is determined, the mental and physical health of the patient and/or other relevant factors. Some aspects of the invention cause the patient and one or more third parties, such as a dispatcher, a medical service provider, hospice attendant, friend, relative or the like to be notified if a dangerous combination of medicines is detected.

In some implementations, a warning appears on one or more features of user interface 290 when a dangerous condition and/or expired medication has been detected in step 310. For example, display 292 and/or speaker 298 may issue a warning in the form of an alarm, a written or spoken message, etc. The message could be a reproduction of a prerecorded message, such as "[TYPE OF MEDICINE] HAS EXPIRED" or "DANGEROUS COMBINATION OF MEDICINE DETECTED. CALL [TELEPHONE NUMBER] FOR DETAILS." The message may reflect a service provided by a third party, e.g., "[TYPE OF MEDICINE] HAS EXPIRED. A NEW PRESCRIPTION IS WAITING FOR YOU AT [PHARMACY]." Some such implementations cause new medication to be delivered to the patient before an old medication has expired.

In some implementations, the action taken in step 325 will involve a communication from (or with) a third party, e.g., delivered from a third party over network 270 via voice over IP ("VoIP"). In some such implementations, controller 225 may not allow door 215 to open unless, for example, a third party has responded and has authorized the door to open. For example, a medical care provider may authorize the door to open by signaling controller 225 via network 270 after speaking with the patient and describing the condition that caused the alert, e.g., the dangerous combination of medicines. The third party may require a certain action by the patient (e.g., of pressing a particular key or series of keys on keypad 294, making a verbal acknowledgment via microphone 297, etc.) before allowing door 215 to be unlocked.

If no condition is detected in step 310 that requires a response, access to SMC 205 may be permitted, if desired, in step 315. In this example, access may be permitted in some circumstances after step 325; this possibility is indicated by the dashed arrow from step 325 to step 315.

When SMC door 215 is opened, sensor 220 indicates the "door open" condition to controller 225 and a timer preferably starts to run. If a new medication is detected by RFID reader 210, the process returns to step 305, wherein the new medicine is evaluated.

In step 320, it is determined whether door 215 is closed within a predetermined period of time. If not, an appropriate alert is made in step 325 according to the type of medicine in SMC 205, the condition of the patient, etc. The process ends in step 330.

Some implementations of the invention also involve detection of which medication is removed from SMC 205 and/or of which medication should have been removed from SMC 205. For example, it may be known that a patient is supposed to receive a particular type of medicine at a particular time intervals (e.g., approximately every 8 hours). This information could be stored locally (e.g., in a memory of controller 225) or in a remote location and accessed via network 270.

It may be inferred that if a patient removes the medication from SMC 205 at or near the appropriate time interval, the patient is taking the medication when needed. Conversely, if a patient has not removed the medication from SMC 205 at or near the appropriate time interval, it may be inferred that the patient is not taking the medication when needed. Accordingly, detection of which medication is removed from SMC 205 in combination with a reference to stored dosage information allows a determination (or at least a strong inference) of whether a patient is taking medication when needed.

Figure 4:
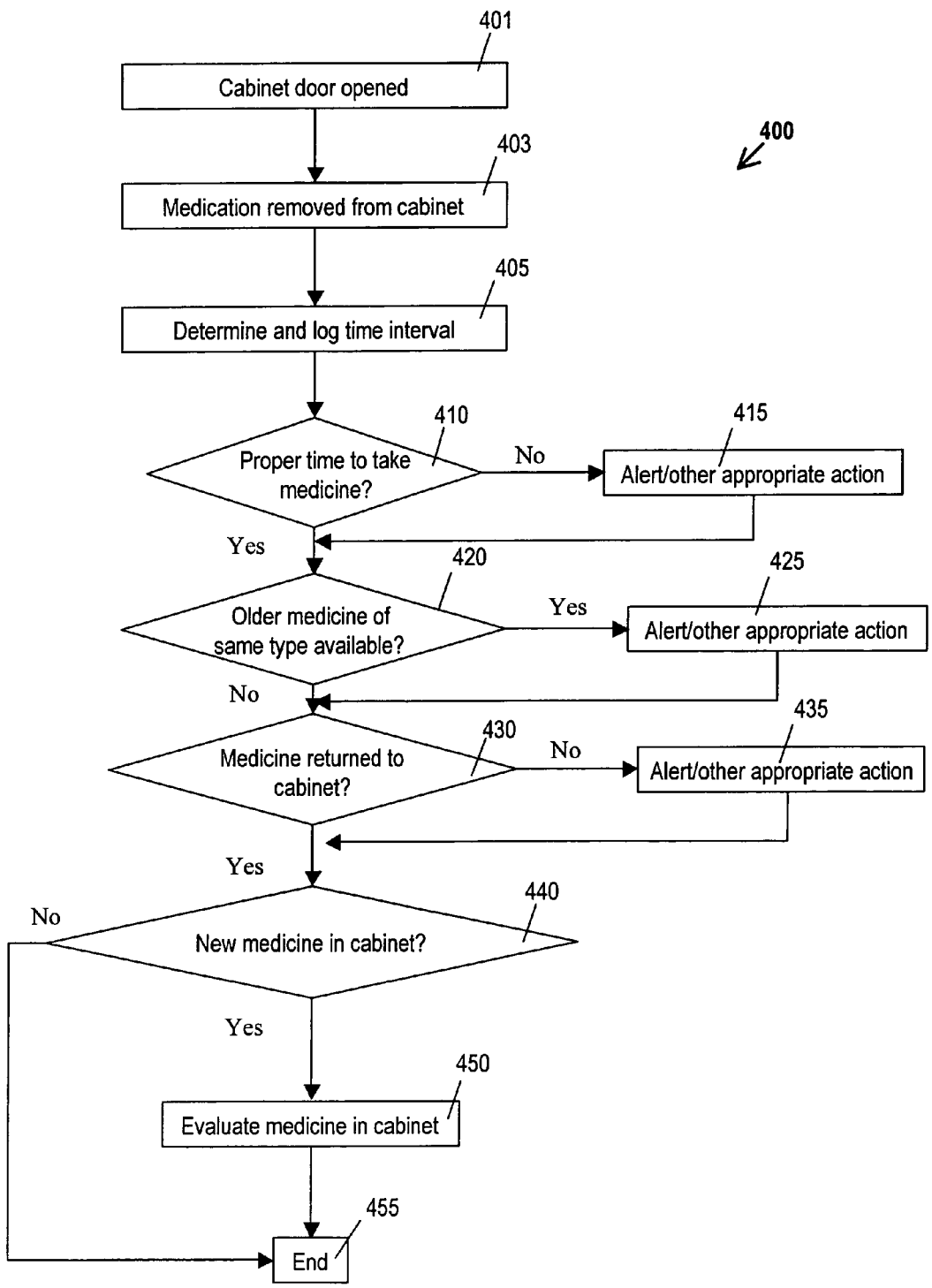
FIG. 4 is a flow chart that outlines another method of the present invention.

Referring to FIG. 4, in step 401 the door of an SMC is opened and in step 403 a particular medicine is removed from the SMC. In step 405, the time interval from the last removal of the medicine from the SMC is determined and logged. In step 410, it is determined whether it is the proper time for the patient to be taking this medication. Preferably, a reasonable time window for the "proper time" is established (e.g., plus or minus one hour) according to the type of drug and other factors.

If it is not the proper time for the patient to take the medicine, the patient and/or one or more third parties will be notified, as appropriate, in step 415. If too much or too little time has elapsed, the patient could, for example, be provided with a warning (via speaker 298 or otherwise) of the possible adverse consequences of the delay or of taking the medicine too soon.

In some such implementations of the invention, a determination that the patient has not taken medication at the proper time interval can trigger not only an alert to the patient and/or third parties, but also an evaluation of the consequences of not taking the medication at the proper time interval and the recommendation of possible follow-up action, such as medical testing. For example, if a patient has not taken a blood-thinning agent for a period of time, controller 225, another device in communication with SMC 205 or a service provider may make a recommendation that the patient have an angiogram and/or schedule an appointment with a doctor or testing laboratory.

Step 420 is illustrative of some related implementations of the invention. In this example, controller 225 determines whether there is another prescription of the selected medication that should be used before the one removed from the smart medical cabinet. If another medication of the same type has an earlier expiration date, the patient will be notified in step 425. However, this feature has broad utility. As set forth elsewhere herein, this is but one example of a broad application of the invention that is directed towards notifying a user when another instance of a selected product should be used before the one selected because it has an earlier expiration date. The same principle may be applied to any perishable good used in commerce, at the production, transportation, wholesale and retail levels of the supply chain.

In step 430, it is determined whether the selected medication has been returned to the smart medical cabinet within a predetermined time. If not, this is could be an indication that the patient is either forgetting the proper use of the smart medical cabinet and/or that the patient is having some type of medical problem. This condition will cause a notification to the patient and/or to a third party. In one such example, the patient may be contacted via a pager, cellular telephone, or the like via network 270.

As in the previously-described implementations, it is advantageous to determine whether a new medication has been placed in the medicine cabinet (step 440) and if so, to evaluate the new medicine (step 445). In step 450, the process ends.

As noted elsewhere herein, the invention is not limited to "smart medical cabinet" implementations. The invention is generally applicable to various substances that may spoil, that have an expiration date beyond which they are not useful, that may cause an allergic reaction and/or that are dangerous when combined.

For example, the invention is generally applicable to indications that food may have spoiled and to providing alerts to this effect and/or providing lockouts of stored food. The invention may be applied at any level of the production and distribution chain.

Some such embodiments of the invention provide various types of "smart storage units" (e.g., refrigerators) that can be implemented for either residential or commercial use. The "storage units" may be very large (e.g., on the scale of one or more warehouses) or quite small (e.g., on the scale of a residential pantry or refrigerator).

Figure 4A:
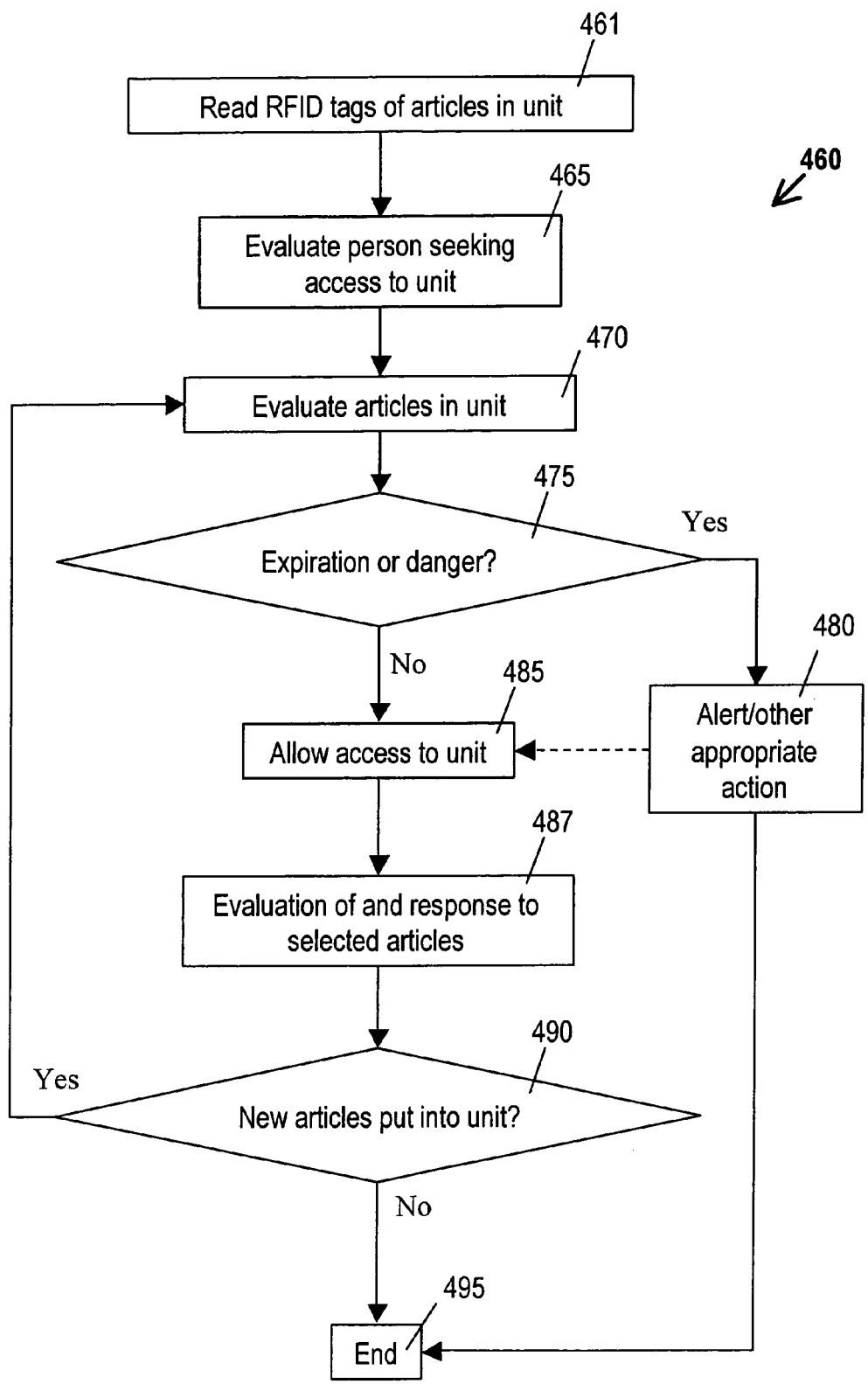
FIG. 4A is a flow chart that outlines still another method of the present invention.

The flow chart of FIG. 4A provides an overview of method 460 according to some such implementations of the invention. In step 461, the RFID tags of articles in the storage unit are read and related data obtained, e.g., as described above. RFID tag data allow an identification of the components of each article.

In step 465, an evaluation is made of a person seeking access to the storage unit. Users of the smart storage unit can identify themselves via a code, biometric information, etc., e.g. as described above with reference to scanner 295. Such a scanner or similar device can read information from a card, a bracelet, or a similar device that contains encoded information indicating, for example, the identity of the bearer and/or any know food allergies. Accordingly, some "smart storage unit" implementations involve the evaluation of a person's allergy information.

For example, such information can be stored in the form of a "charm bracelet" that includes small RFID tags identifying types of products to which the bearer is allergic. Some such devices do not include the identity of the bearer. However, the more specifics regarding the bearer's allergies, preferences, etc., are included, the more easily the bearer can be identified.

In step 470, the contents of the storage unit are evaluated. In this example, the products in the storage unit are evaluated in view of allergy information, if any, provided by the person desiring access. The contents of the storage unit can be evaluated according to such allergy information, according to the RFID codes of products contained in the storage unit and according to database information regarding the composition of these products.

If it is determined in step 475, for example, that a product contained in the storage unit includes a substance known to cause an allergic reaction to the user, a notification and/or alarm may be produced (step 480). In one implementation, products contained in the storage unit that include a substance known to cause an allergic reaction to the user will be indicated by an audio and/or visual warning, such as that described above with reference to user interface 290.

In some implementations, steps 470 and 475 involve determining that perishable foods, such as meat or dairy products, have been transported and/or stored at temperatures that are above a safe range for these foods. Step 480 may provide an indication that the food should not be sold and/or eaten, that the expiration date should be made earlier than normal for foods intended for resale, etc.

In addition, alerts can be provided regarding possibly dangerous combinations of substances in the storage unit. For example, certain types of cleaning agents (such as ammonia and chlorine) should not be used in combination. Certain substances may cause an explosion or other unexpected reaction when combined. Similarly, certain types of chemicals cannot be transported in the same truck (e.g., tanks of oxygen and hydrogen).

If no dangerous condition is detected and the user is approved, access to the storage unit will be permitted (step 485). If some unfavorable condition has been detected, access may or may not be permitted depending on the severity of the problem (see dashed arrow).

Step 487 can involve various types of responses to a user's selection of products in the storage unit. In one implementation, a response will be provided according to a user's allergies. In one such example, an alarm will sound in step 487 if a user with a peanut allergy removes a product that contains peanuts.

According to other implementations of the invention, when a user selects a desired product, the user will be advised in step 487 when there is another product of the same type that has an earlier expiration date. The date could be a nominal expiration date that is indicated by an RFID tag or could be a modified expiration date that has, for example, been made earlier because of the product's storage history. For example, if a truck is at a warehouse and loading up a supply of milk to transport, some implementations will indicate the milk with the earliest expiration date.

In step 490, it is determined whether any new articles have been put into the storage unit. If so, the new products are evaluated as before. If not, the process ends. (Step 495.)

Figure 5:
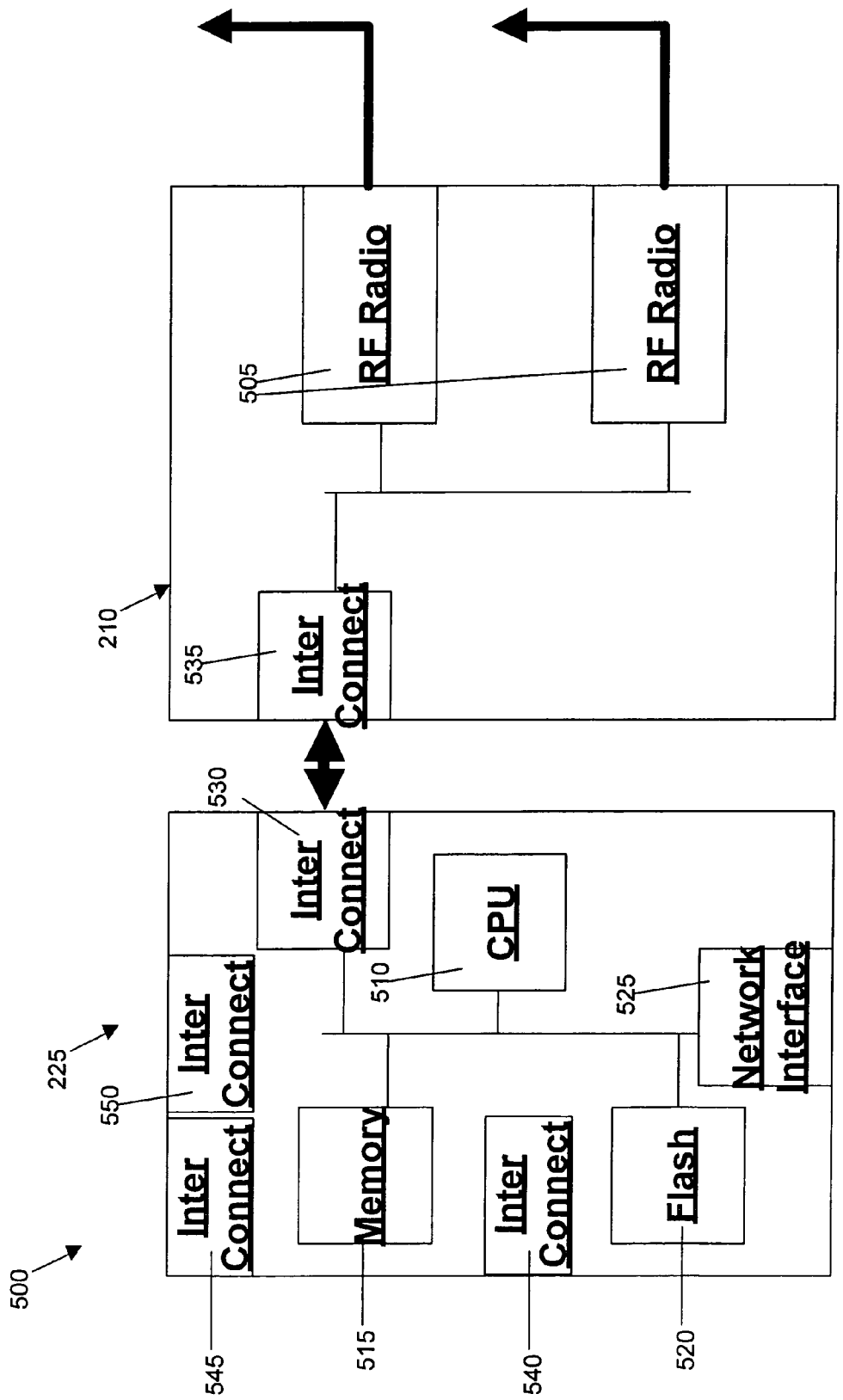
FIG. 5 is a block diagram that illustrates one embodiment of an RFID reader and a controller for a smart medical cabinet or similar device according to the present invention.

FIG. 5 illustrates system 500, including controller 225 and a "stripped down" version of RFID reader portion 210. Here, the intelligence for controlling RFID reader 210 resides in controller 225. RFID reader 210 includes one or more RF radios 505 for transmitting RF waves to, and receiving modulated RF waves from, RFID tags. RF radios 505 provide raw RF data that is conveyed to controller 225 and converted by an analog-to-digital converter (not shown).

Interconnect 530 of controller 225 is configured for communication with interconnect 535 of RFID reader portion 210. In this example, interconnects 540, 545 and 550 provide communication between controller 225 and sensor 220, lock 222 and user interface 290, respectively. The communication may be via any convenient medium and format, such as wireless, serial, point-to-point serial, etc. Network interface 525 may be any convenient type of interface, such as an Ethernet interface, for communicating with network 270.

In this example, CPU 510 controls the other devices of SMC 205 according to software stored in local memory. CPU 510 is configured to communicate with other devices across network 270, e.g., to search medical database 275 and to make at least a preliminary analysis of the results. CPU 510 controls display 292 and speaker 298 of user interface 290 according to, inter alia, such an analysis. CPU 510 receives and processes user input from keypad 294, sensor 295 and microphone 297 of user interface 290. CPU 510 controls lock 222 based in part on this input. CPU 510 determines whether door 215 is open or closed according to signals from sensor 220.

Although only one RFID reader portion 210 is depicted in the smart medicine cabinet of FIG. 2, some embodiments of the present invention include multiple RFID readers 210. Each controller 225 may control a plurality of RFID readers 210.

Flash memory 520 may be used to store a program (a "bootloader") for booting/initializing controller 225. The bootloader, which is usually stored in a separate, partitioned area of flash memory 520, also allows controller 225 to recover from a power loss, etc. As described in the RFID Networking Applications, some implementations of flash memory 520 include instructions for controlling CPU 510 to form "DHCPDISCOVER" requests to initiate a provisioning/configuration cycle. In some such implementations, flash memory 520 is used to store personality information and other configuration information obtained from, e.g., a DHCP server during such a cycle. However, such information is preferably stored in volatile memory 415 only after being received from, e.g., a DHCP server.

Figure 6:
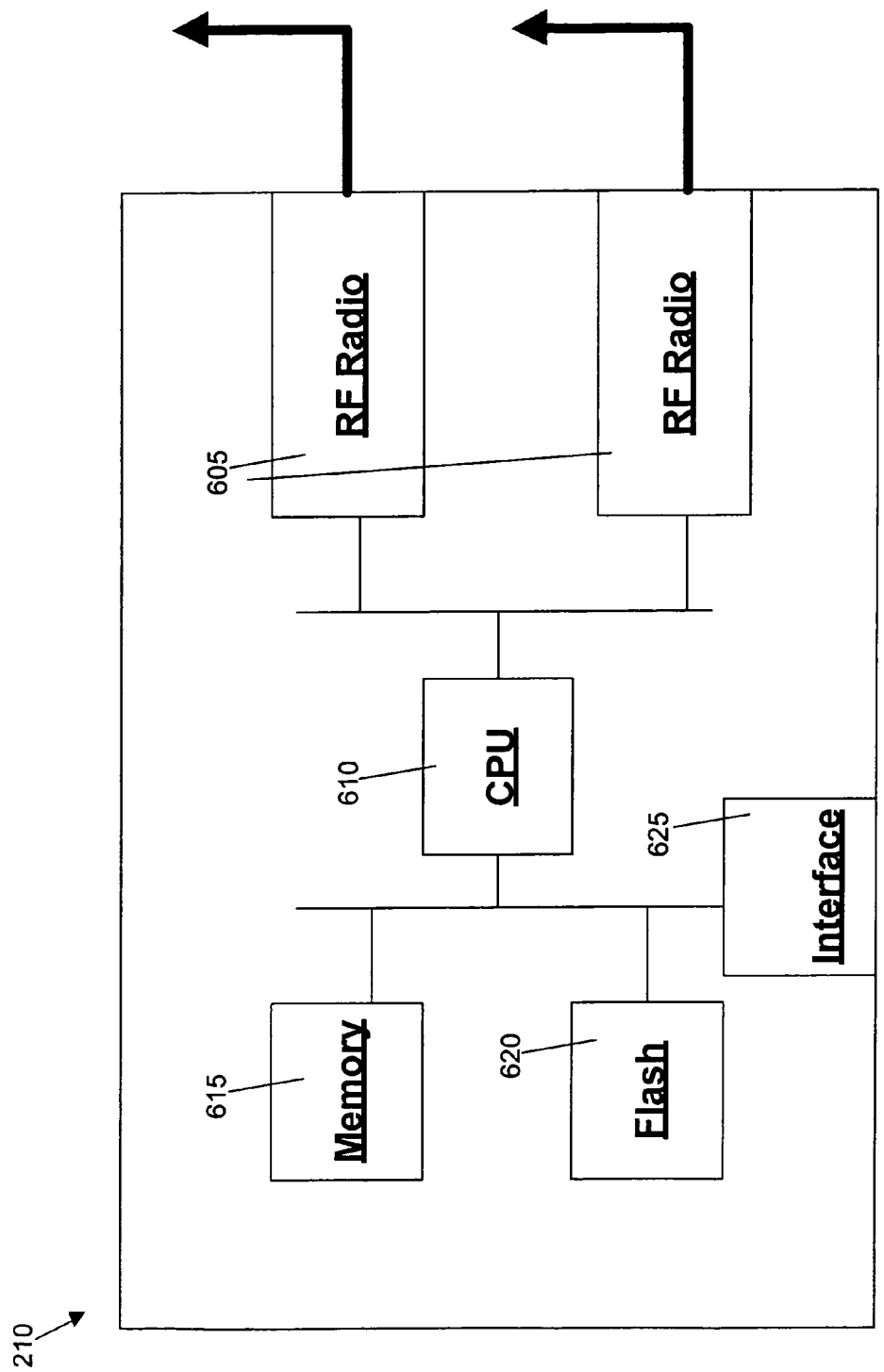
FIG. 6 is a block diagram of an exemplary RFID reader that may be configured to perform some methods of the present invention.

FIG. 6 illustrates a relatively more intelligent RFID reader 210 that can be configured to perform methods of the present invention. RFID reader 210 includes one or more RF radios 605, as described above with reference to FIG. 5. Data from RF radios 605 may be stored, at least temporarily, by CPU 610 in memory 615 before being transmitted to controller 225 via interface 625. Flash memory 620 may be used to store a bootloader for initializing RFID reader 210.

Figure 7:
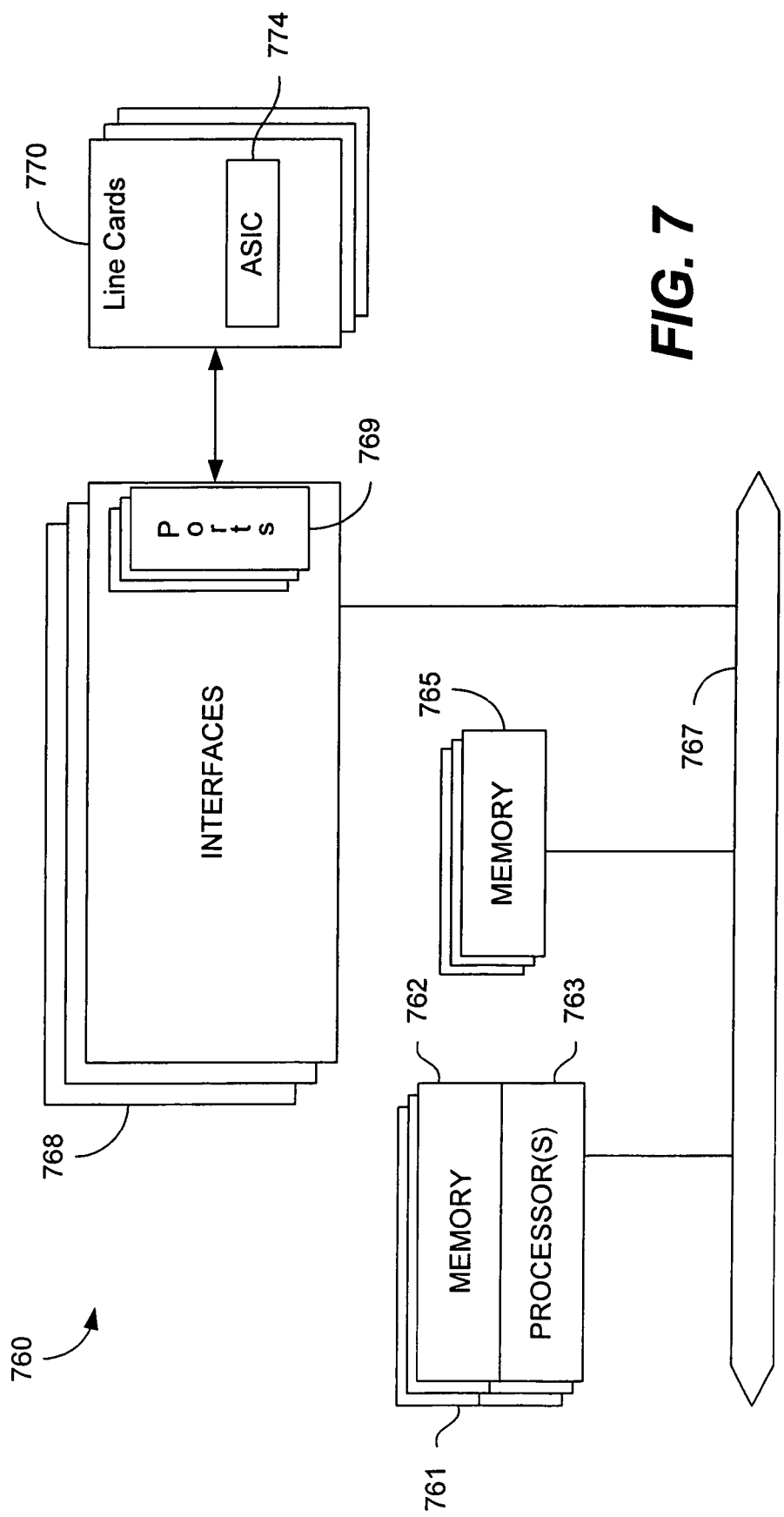
FIG. 7 illustrates an example of a network device that may be configured to implement some methods of the present invention.

FIG. 7 illustrates an example of a network device that may be configured to implement some methods of the present invention. Network device 760 includes a master central processing unit (CPU) 762, interfaces 768, and a bus 767 (e.g., a PCI bus). Generally, interfaces 768 include ports 769 appropriate for communication with the appropriate media. The interfaces 768 are typically provided as interface cards (sometimes referred to as "line cards") 770. Generally, line cards 770 control the sending and receiving of data packets over the network and sometimes support other peripherals used with the network device 760. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

In some embodiments, one or more of line cards 770 includes at least one independent processor 774 and, in some instances, volatile RAM. Independent processors 774 may be, for example ASICs or any other appropriate processors. According to some such embodiments, these independent processors 774 perform at least some of the functions of the logic described herein. In some embodiments, one or more of interfaces 768 control such communications-intensive tasks as media control and management. By providing separate processors for the communications-intensive tasks, line cards allow the master microprocessor 762 efficiently to perform other functions such as routing computations, network diagnostics, security functions, etc.

When acting under the control of appropriate software or firmware, in some implementations of the invention CPU 762 may be responsible for implementing specific functions associated with the functions of a desired network device. According to some embodiments, CPU 762 accomplishes all these functions under the control of software including an operating system (e.g. Linux, VxWorks, etc.), and any appropriate applications software.

CPU 762 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

Regardless of network device's configuration, it may employ one or more memories or memory modules (such as, for example, memory block 765) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 7) or switch fabric based (such as a cross-bar).

OTHER EMBODIMENTS

Although illustrative embodiments and applications of this invention are shown and described herein, many variations and modifications are possible which remain within the concept, scope, and spirit of the invention, and these variations would become clear to those of ordinary skill in the art after perusal of this application.

For example, some implementations of the invention provide alerts to a user if a harmful substance or a substance to which a person is allergic was recently present. For example, if a cat was recently detected in a room, a person bearing a bracelet or similar device indicating a cat allergy would be alerted to the recent presence of the cat.

Moreover, the "smart medical cabinet" implementations of the invention are not limited to static applications. For example, service-providing robots are known in the art, such as the house utility "BANRYU™" robot provided by Sanyo Co., Ltd., the Robotic Information Home Appliance "Apri-Alpha™" provided by Toshiba Corporation and the "ER-1 Personal Robot System" provided by Evolution Robotics, Inc. Some implementations of the invention combine the services of such a robot and the functionality of a mobile smart medicine cabinet. The connections between the mobile smart medicine cabinet and network 270 may be made, for example, via wireless devices and protocols.

Accordingly, the present embodiments are to be considered as illustrative and not restrictive, and the invention is not to be limited to the details given herein, but may be modified within the scope and equivalents of the appended claims.

We claim:

1. A smart medicine cabinet, comprising:
 a storage area;
 a radio frequency identification ("RFID") reader configured for reading RFID tag data for a medical product stored in the storage area;
 a user interface configured for communication with a user;
 a network interface configured for communication with a network;
 a door;
 a scanner for detecting a user of the smart medicine cabinet;
 a memory containing user-specific medical information for each of one or more users of the smart medicine cabinet; and
 a controller configured to retrieve user-specific medical information corresponding to the user detected by the scanner, obtain product-specific medical information based on the RFID tag data received from the RFID reader and to control the smart medicine cabinet according to the user-specific medical information and the product-specific medical information, and wherein the controller is further configured to, upon detection of the pressing of an emergency open button by the user, communicate across a network to a third party requesting authorization to open the smart medicine cabinet.

2. The smart medicine cabinet of claim 1, wherein the controller is further configured to obtain the product-specific medical information by searching a networked medical database via the network interface.

3. The smart medicine cabinet of claim 1, wherein the controller is further configured to control the door according to information received via the user interface.

4. A method for providing medical services, the method comprising:
 reading radio frequency identification ("RFID") tag data for a medical product in a medicine cabinet;
 automatically obtaining product-specific medical information according to the RFID tag data;
 evaluating the medical information;
 identifying a user;
 automatically obtaining user-specific medical information corresponding to the user;
 comparing the product-specific medical information and the user-specific medical information; and
 providing a response according to the comparison;
 detecting the pressing of an emergency open button by the user, and
 in response to said detection of the pressing of an emergency open button by the user, communicating across a network to a third party requesting authorization to open the smart medicine cabinet.

5. The method of claim 4, wherein the response comprises alerting a user regarding an expiration date of the medicine product in the medicine cabinet.

6. The method of claim 4, wherein the response comprises requesting replacement medicine.

7. The method of claim 4, wherein the response comprises providing a wanting that a combination of medicine in the medicine cabinet could be dangerous.

8. The method of claim 4, wherein the step of obtaining medical information comprises searching a medical database.

9. The method of claim 4, wherein the response comprises preventing a user from opening the medicine cabinet.

10. The method of claim 4, wherein the response comprises communicating with a user via a user interface of the medicine cabinet.

11. The smart medicine cabinet of claim 1, wherein the scanner comprises a biometric scanner.

12. The smart medicine cabinet of claim 1, wherein the scanner comprises one of an RFID) scanner or a bar code scanner.

13. The smart medicine cabinet of claim 1, wherein the scanner is configured to read information from a card, a bracelet or similar device.

14. The smart medicine cabinet of claim 1, wherein the scanner is configured to read information from a card, a bracelet or similar device.

15. The smart medicine cabinet of claim 1, wherein the controller is further configured to prevent an authorized user from opening the door under predetermined conditions.

16. The smart medicine cabinet of claim 1, further comprising an emergency control that allows a user to open the smart medicine cabinet without using the input device or the scanner.

17. The smart medicine cabinet of claim 1, wherein the user-specific medical information includes information about the user's allergies.

18. The smart medicine cabinet of claim 1, wherein the user-specific medical information includes information about the user's medical condition.

19. The smart medicine cabinet of claim 1, wherein the product-specific medical information includes dosage frequency.

20. The smart medicine cabinet of claim 19, wherein the controller is further configured to track the frequency at which the medical product is removed from the smart medicine cabinet, compare the frequency to the dosage frequency, and control the smart medicine cabinet if the comparison indicates that the user is not following the dosage frequency.

21. The method of claim 4, wherein the user-specific medical information includes information about the user's allergies.

22. The method of claim 4, wherein the user-specific medical information includes information about the user's medical condition.

23. The method of claim 4, wherein the product-specific medical information includes dosage frequency.

24. The method of claim 19, further comprising:
    tracking the frequency at which the medical product is removed from the smart medicine cabinet;
    comparing the frequency at which the medical product is removed from the smart medicine cabinet to the dosage frequency; and
    controlling the smart medicine cabinet if the comparison indicates that the user is not following the dosage frequency.

25. The smart medicine cabinet of claim 1, wherein the communicating across a network to a third party requesting authorization to open the smart medicine cabinet includes communicating via a microphone and speaker.

26. The method of claim 4, wherein the communicating across a network to a third party requesting authorization to open the smart medicine cabinet includes communicating via a microphone and speaker.

* * * * *